United States Patent [19]
Fruscella et al.

[11] 3,874,573
[45] Apr. 1, 1975

[54] FISHING ROD HOLSTER

[76] Inventors: Frederick A. Fruscella, 6179 Eldridge Blvd.; Louis R. Hanzel, 24680 Shekborne, both of Bedford Heights, Ohio 44146

[22] Filed: Aug. 1, 1973

[21] Appl. No.: 384,437

[52] U.S. Cl. .................................. 224/5 E, 248/38
[51] Int. Cl. .............................................. A45f 5/00
[58] Field of Search ............ 224/1 B, 5 R, 5 A, 5 C, 224/5 E, 5 J, 22; 248/38; D22/13, 14

[56] References Cited
UNITED STATES PATENTS

| | | | |
|---|---|---|---|
| 2,204,692 | 6/1940 | Parisio | 248/38 |
| 2,954,909 | 10/1960 | Miller et al. | 224/5 E |
| D200,474 | 3/1965 | Boldosser | D22/14 |

Primary Examiner—Albert J. Makay
Assistant Examiner—Ross Weaver
Attorney, Agent, or Firm—Donnelly, Maky, Renner & Otto

[57] ABSTRACT

A one-piece fishing rod holster includes a substantially flat base plate having integral belt attaching means on an upper portion thereof. The base plate has integral upwardly opening loop means extending outwardly therefrom for receiving a fishing rod handle.

8 Claims, 4 Drawing Figures

PATENTED APR 1 1975 3,874,573
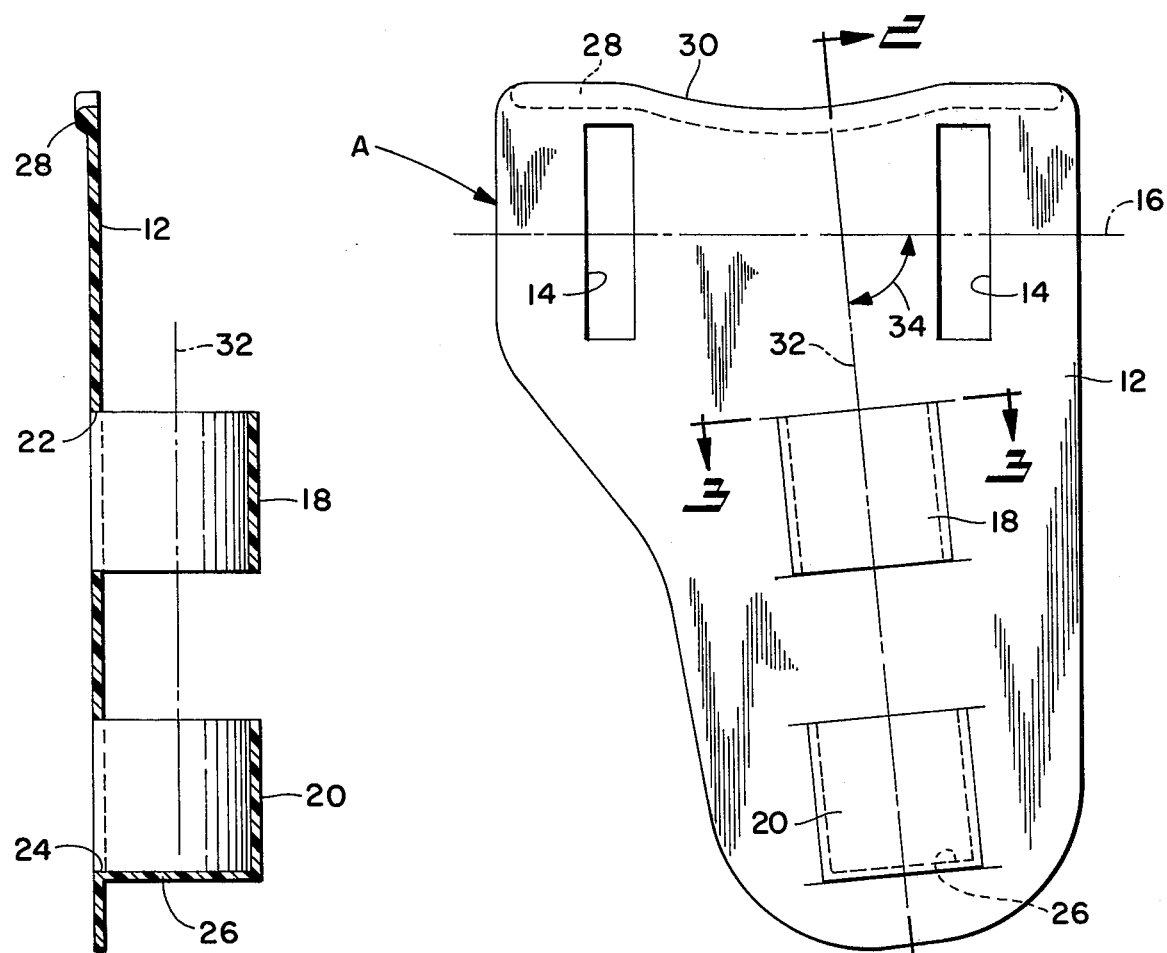
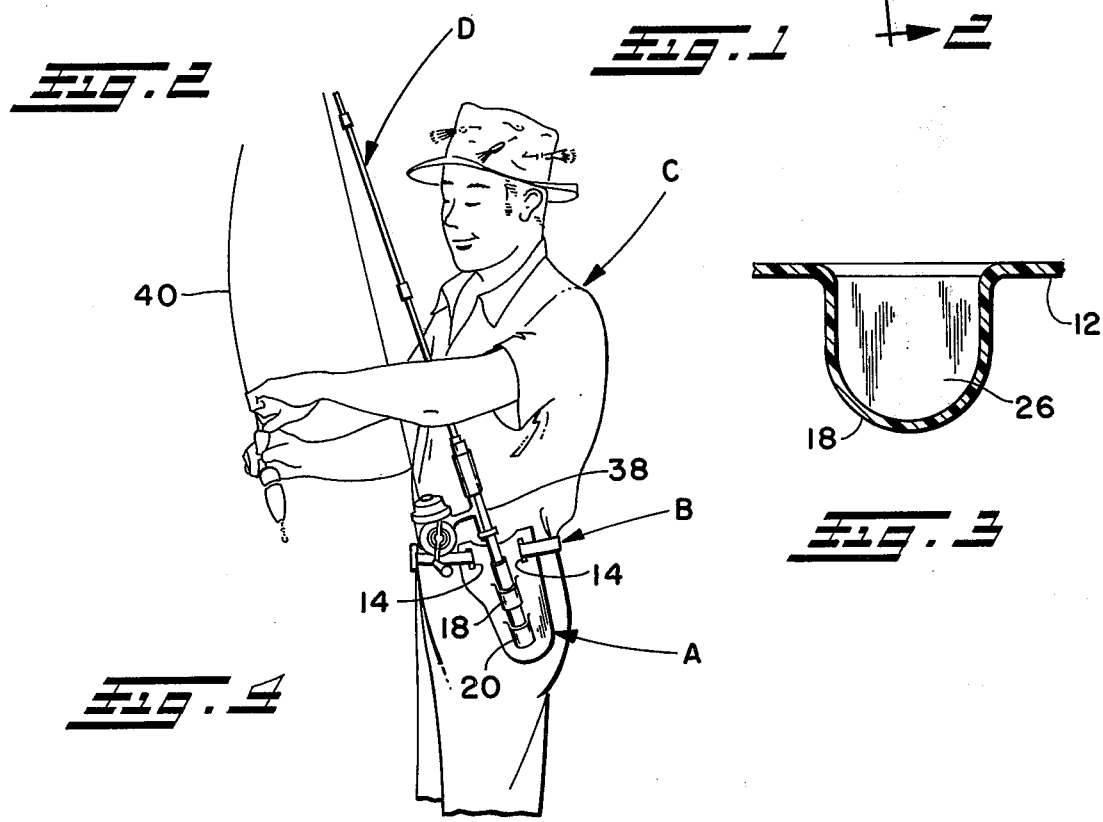

FISHING ROD HOLSTER

BACKGROUND OF THE INVENTION

This application pertains to the art of belt mounted holsters, and more particularly to a holster for holding a fishing rod.

Supporting a fishing rod while baiting a hook, changing lures or removing a fish is very difficult. Gripping the rod under one armpit places the rod in a relatively unstable position from which it can easily be dropped. Furthermore, the arm under which the rod is gripped can be used only outwardly from the elbow. Placing the rod on the ground may cause sand or other foreign matter to enter the delicate reel mechanism and cause damage. A rod placed on the ground or on a pier is also subject to damage being stepped upon. There is also a safety hazard because persons may trip over the rod.

Many devices have been proposed for supporting a fishing rod from a fisherman's belt. Such a support frees both of the fisherman's hands and makes it unnecessary to place the rod on the ground or pier. Previous support devices of this type have been extremely complicated and expensive to manufacture. Therefore, the devices have not found wide acceptance.

SUMMARY OF THE INVENTION

In accordance with the present invention, a fishing rod holster is of one-piece construction and includes a substantially flat base plate having integral belt attaching means on an upper portion thereof. Integral upwardly opening loop means extends outwardly from the base plate for receiving a fishing rod handle. The holster is molded from any suitable synthetic plastic material such as high density polyethylene or polyvinylchloride. The plastic material is relatively stiff and yet flexible.

In a preferred arrangement, the upper edge of the base plate has a smoothly curved bead along the full length thereof so there are no sharp edges to dig into a person's waist and cause discomfort. The belt attaching means may be in the form of a pair of spaced-apart belt receiving slots. The upper edge of the base plate curves downwardly between the slots so the holster does not project high above the belt.

In a preferred arrangement, the loop means includes a pair of generally vertically spaced loops. The base plate has openings therein spanning each loop and is continuous between the loops. Integral stop means extends outwardly from the base plate adjacent the bottom of the loop means for abutment by the terminal end of a fishing rod handle. The stop means may comprise a closed bottom on the lowermost of the pair of loops.

In accordance with another aspect of the invention, the belt attaching means extends across the base plate along a predetermined axis. The longitudinal axis of the loop means extends at an acute included angle to that predetermined axis. With this arrangement, a fishing rod supported in the holster is inclined forwardly from the person so that the line hangs down from the tip of the rod directly in front of the person for easy manipulation by the person's hands.

It is a principal object of the present invention to provide an improved fishing rod holster.

Another object of the invention is to provide a one-piece fishing rod holster which is very economical to manufacture.

A further object of the invention is to provide a fishing rod holster which firmly supports a fishing rod from a person's belt with the rod at a foward inclination so the line can easily be manipulated by the person's hands.

BRIEF DESCRIPTION OF THE DRAWING

FIG. 1 is a plan view of a fishing rod holster constructed in accordance with the present invention;

FIG. 2 is a cross-sectional elevational view looking generally in the direction of arrows 2—2 of FIG. 1;

FIG. 3 is a cross-sectional view looking generally in the direction of arrows 3—3 of FIG. 1; and FIG. 4 is an elevational view showing the improved fishing rod holster of the present invention in use.

DESCRIPTION OF A PREFERRED EMBODIMENT

Referring now to the drawings, wherein the showings are for purposes of illustrating a preferred embodiment of the invention only and not for purposes of limiting same, FIG. 1 shows a fishing rod holster A constructed in accordance with the present invention.

Holster A is molded in one-piece from synthetic plastic material such as high density polyethylene or polyvinylchloride. Holster A includes a substantially flat and thin base plate 12 having belt attaching means integral with the upper portion thereof. Obviously, the integral belt attaching means may take many forms such as hooks which can be hooked over a belt or slits which can be opened for receiving a belt without removing the belt from the waist. It is also possible to have a belt formed integral with the upper portion of the base plate. In accordance with one arrangement, the belt attaching means comprises a pair of generally vertically extending horizontally spaced-apart slots 14 through which a belt can be extended. Slots 14 define a belt attaching means which extends across the upper portion of base plate 12 generally along a predetermined substantially horizontal axis 16.

Loop means is formed integral with base plate 12 to provide a socket for receiving a handle of a fishing rod. The loop means may take many forms. For example, a single axially elongated loop may be provided in base plate 12. A single loop or a plurality of loops can simply be hook-like arcuate loops which are not closed. It is also possible to have a plurality of such hook-like loops opening in opposite directions so that a rod would be receivable in the loops by pivoting the handle rather than by inserting it into the loops axially. In accordance with one arrangement, the loop means includes a pair of generally vertically spaced upper and lower loops 18 and 20. Each loop 18 and 20 is generally U-shaped and is continuous. Base plate 12 has rectangular openings 22 and 24 completely therethrough spanning each of loops 18 and 20. This makes it much easier to form loops 18 and 20 integral with base plate 12, although it will be appreciated that it is possible to have base plate 12 completely closed rearwardly of the loops. Base plate 12 is continuous between loops 18 and 20 to provide a closed wall between the loops. Therefore, when a fishing rod handle is received in loops 18 and 20, it cannot be displaced through opening 24 because of the continuous portion of base plate 12 between the loops.

In accordance with the invention, integral stop means on base plate 12 is located adjacent the bottom of lower loop 20 for abutment by a terminal end of a fishing rod handle. The reel is located at different distances from the terminal end of different types of fly casting and spin casting rods. Therefore, instead of relying upon the reel as a stop for engagement with the loop means, it is desirable to have a separate stop for abutment by the terminal end of the rod handle. This insures firm support and desirable positioning of the rod regardless of the location of the reel. Obviously, the stop means may take many different forms. Such a stop may be an integral projection extending outwardly from base plate 12 and spaced downwardly from lower loop 20. Such a stop may also be defined by making lower loop 20 somewhat conical so that the terminal end of a rod handle would fit into its upper portion and jam against the inwardly tapering walls. In the preferred arrangement, the stop means comprises an integral bottom wall 26 for loop 20. Bottom wall 26 is integral with base plate 12 and bottom loop 20.

In accordance with another aspect of the invention, the upper edge of base plate 12 has a smoothly curved bead 28 extending along substantially the entire length thereof. In one arrangement, bead 28 is formed along the upper edge of base plate 12 on the rear surface thereof. Smoothly curved bead 28 has a thickness greater than the thickness of the remainder of base plate 12 to provide a smoothly curved upper edge having a relatively large radius. Smoothly curved bead 28 eliminates sharp edges which might dig into the side of a person wearing holster A. In addition, the upper edge of base plate 12 is also curved downwardly as at 30 between slots 14 so that base plate 12 will not project high above the person's belt where it might dig into the person's side when the person bends at the waist or sits down.

Loops 18 and 20 have a longitudinal loop axis 32 which extends at an acute included angle 34 to predetermined axis 16. Angle 34 may be around 80°. With such an arrangement, a rod supported in loops 18 and 20 will extend forwardly of a person wearing the holster as shown in FIG. 4. This places the tip of the rod upwardly and forwardly of the person so that the line will hang down immediately in front of the person where it can easily be manipulated. The outer face of base plate 12 lies in a plane and longitudinal loop axis 32 is preferably parallel to that plane.

It is obvious that additional sets of loops 18 and 20 may be provided on base plate 12 so that the rod would extend at various angles. It is also obvious that additional sets of belt slots 14 may be provided and extend along an axis different from axis 16. Such additional loops or belt slots can be provided for locating holster A in a proper position on a person's belt when the person is standing or sitting. One set of belt slots or loops would be used when the person is standing and another set while the person is sitting. A person's belt is generally horizontal when standing and is inclined at an angle to the horizontal when sitting. Therefore, angle 34 for a sitting position would be much smaller, such as around 45°.

It is obvious that many other arrangements could also be provided within the scope of the present invention. For example, an integral flap could be provided along the upper edge of base plate 12 for looping behind a person's belt and then snapping onto a snap attached to the rear surface of base plate 12. The loop means may be completely open at the bottom for some situations such as supporting a surf casting rod or carrying an extra rod and reel. The reel would then form the stop by engaging the upper edge of the loop means. Additional loops may be provided in base plate 12 for different types of reels. One set of loops could be used for carrying an extra rod and reel, while the other set of loops would be used for supporting the rod being used by the person. Only lower loop 20 may be socket-like for receiving the terminal end portion of a rod handle while the upper loop could simply be a projection extending outwardly from base plate 12 so that the rod handle would be cantilevered against that upper projection.

FIG. 4 shows holster A having belt B of a person C extending through slots 14. Handle 38 of fishing rod D is received in loops 18 and 20. Rod D is inclined forwardly of the person so that line 40 hangs downwardly from the tip of rod D directly in front of person C for easy manipulation by the person's hands.

In the preferred arrangement, the upper portion of base plate 12 has a width substantially greater than the lower portion thereof. This provides relatively wide belt attaching means to prevent pivotting of holster A due to the couple produced by the inclination of rod D. At the same time, it saves material by making the lower portion of base plate 12 relatively narrow and reduces the bulk of holster A so that it will not cause discomfort or interference to a person wearing the same. Preferably, the loop means defined by loops 18 and 20 is located generally in the lower portion of base plate 12 below the belt attaching means defined by slots 14. This location of the loop means enables a belt to be threaded through one slot 14 from the rear surface of base plate 12 and then over the outer surface of base plate 12 through next slot 14. The large amount of material between slots 14 provides firm frictional engagement with the belt so that holster A will be held in a very stable position against slippage or tilting. Providing loops 18 and 20 below the loop attaching means also lowers the location of the couple developed by the inclination of the rod supported in the holster, while the weight of the rod provides a downward force on the holster to minimize twisting of the holster or belt by the couple.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

The embodiments of the invention in which an exclusive property or privilege is claimed are defined as follows:

1. A one-piece fishing rod holster comprising; a substantially flat base plate including an upper portion having belt attaching means integral therewith for attaching said plate to a belt, upwardly opening loop means integral with said plate and extending outwardly therefrom for receiving a fishing rod handle, said loop means including a pair of longitudinally-spaced loops, and said plate having openings therethrough spanning each said loop and being continuous between said loops.

2. The holster of claim 1 wherein said pair of loops include upper and lower loops and said lower loop has a closed bottom.

3. The holster of claim 1 wherein said plate has a lower portion having a width substantially less than said upper portion.

4. The holster of claim 1 wherein said plate has a rear surface and an upper edge, and further including a smoothly curved bead on said rear surface along said upper edge.

5. The holster of claim 1 wherein said plate has an upper edge and said belt attaching means comprises spaced-apart slots in said plate, said upper edge being downwardly curved between said slots.

6. The holster of claim 1 wherein said loops include upper and lower loops and said lower loop has a bottom portion, and integral stop means projecting outwardly from said plate adjacent said bottom portion for abutment by a terminal end of a rod handle received in said loops.

7. The holster of claim 1 wherein said belt attaching means extends across said plate along a predetermined axis and said loops have a longitudinal axis extending at an acute included angle to said predetermined axis.

8. The holster of claim 1 wherein said plate has a lower portion and said loops are on said lower portion.

* * * * *